May 24, 1949.  T. F. FAGAN  2,471,205
DENTAL FLASK
Filed Nov. 5, 1946
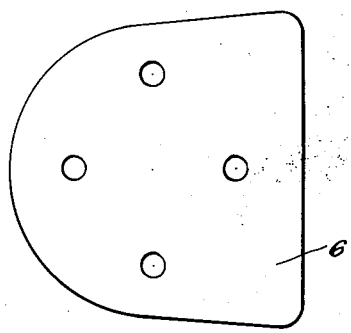
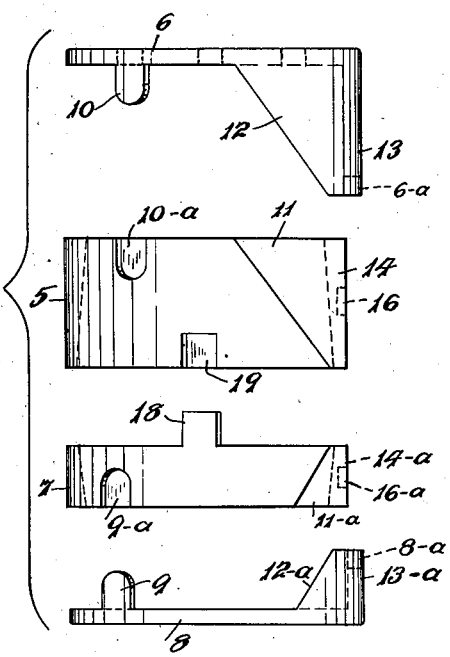
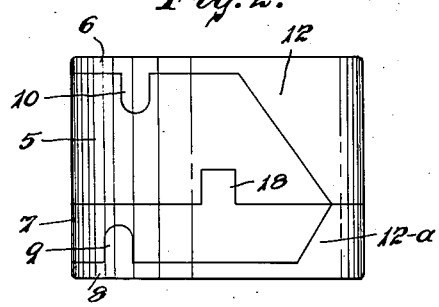
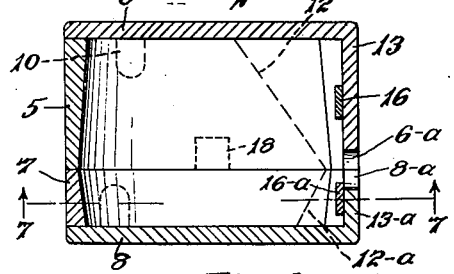
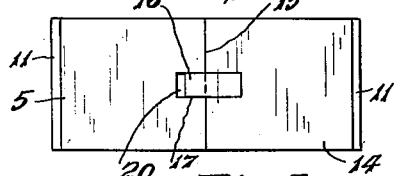
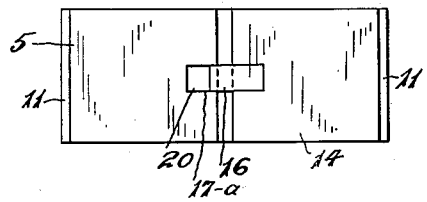
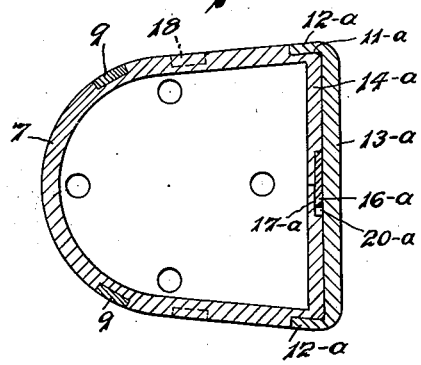
INVENTOR.
THOMAS F. FAGAN.
BY
Louis V. Lucia
ATTORNEY.

Patented May 24, 1949

2,471,205

UNITED STATES PATENT OFFICE 2,471,205

DENTAL FLASK

Thomas F. Fagan, Columbia, Conn.

Application November 5, 1946, Serial No. 707,959

3 Claims. (Cl. 18—33)

This invention relates to dental flasks and more particularly to such flasks as are used by dentists in molding dental plates and teeth.

In the use of such flasks, as heretofore constructed, for molding with plasters or similar materials, a great deal of inconvenience has been experienced due to the fact that the molding material becomes so firmly adhered to the inner walls of the flask that it becomes necessary to hammer upon the wall of the flask in order to loosen the mold so that it can be withdrawn from the flask without causing breakage of the teeth and necessitating an entirely new molding operation.

In conventional flasks as used heretofore, the inner walls have been constructed with a taper so as to facilitate removal of the mold. This, however, has also been found inconvenient for the reason that it requires hammering on the flask to loosen the mold before it can be removed from the flask.

It is an object of this invention, therefore, to provide a dental flask which will permit easy removal of the mold therefrom without first requiring drastic means for loosening the mold from the flask.

A further object of this invention is to provide a flask which may be partly opened with a simple tool to unbind the mold therefrom and permit the easy removal of said mold from the flask.

A further object of the invention is to provide a flask having a shallow section and a deep section and which is reversible so that the section best suited may be used for casting a particular piece.

Further objects and advantages of this invention will be more clearly understood from the following description and from the accompanying drawings in which—

Figure 1 is an elevational plan view of a flask embodying my invention.

Figure 2 is an elevational side view thereof.

Figure 3 is a side view in central vertical section.

Figure 4 is an elevational rear view of one of the flask sections with the cover removed therefrom.

Figure 5 is a similar view of said section, showing the same in partly opened position for the removal of a mold therefrom.

Figure 6 is an exploded elevational side view of said mold with the different sections thereof in separated position.

Figure 7 is a plan view in section on line 7—7 of Fig. 3.

As shown in the drawings, my improved flask may comprise a section 5 having a cover 6 thereon and a shallow section 7 having a cover 8.

Each of said sections 5 and 7 are in the form of rings, preferably shaped as illustrated, although they may be shaped differently to suit any particular requirements.

The section 5 has notches 10—a, at the outer side thereof, to receive prongs 10 on the cover 6 for locking and retaining said cover to the said section, the notches 10—a being of a depth that is less than the thickness of the wall of the section, as clearly shown in Fig. 7.

At the rear portion of the said section, there is provided, at each side thereof, a depression 11 which is adapted to receive the projections 12 on the cover 6 which bracket a rear wall 13 that fits against the outer surface of the rear wall 14 of said section 5.

In order to permit opening of the said section to a slight degree, which is sufficient to loosen the mold from within said section, the rear wall 14 is separated at 15, as clearly shown in Figs. 4 and 5. The portion of the wall at one side of said separation is provided with a tongue 16 which extends into a groove 17, in the portion of said wall at the opposite side of the separation 15, to retain the two sections of said wall in alignment. The said groove is preferably made longer than the tongue 16 so that it will provide a space 20 between the end of the groove and the end of the tongue into which may be inserted a suitable tool for prying the two sections of the wall apart into the position illustrated in Fig. 5 so as to loosen the mold within the section.

It will be noted that the groove 17 is of a depth less than the thickness of the wall 14 so as to prevent an irregular surface on the inner side of said wall.

The shallower flask section 7 is constructed in exactly the same manner as the section 5 and has tongues 18 which fit into notches 19 in the section 5 for retaining the two sections together and in alignment.

It will be noted from the illustration that, when the covers 6 and 8 are in position upon their relative sections 5 and 7, the said sections will be securely held against opening at the slit 15 by means of the projections 12 on the cover 6 and 12—a on the cover 7. The rear walls 13 and 13—a will back, and thereby re-inforce, the rear walls 14 and 14—a of the two sections so that a pressure may be applied upon the flask to compress the molding material therein without the danger of forcing the rear walls 14 and 14—a outwardly.

The covers 6 and 8 are each provided with a notch 6—a and 8—a in the rear wall thereof to permit the insertion of a sharp tool between the upper and lower flask sections to separate them for the inspection of the interior of the flask, or to permit adding more molding material during a molding operation without disturbing the said covers.

From the above description it will be readily understood that my invention provides a dental flask from which the molds may be easily removed, after they have hardened therein, by simply inserting a tool, such as a screw driver or the like into the space between the end of the tongue 16 and the end of the groove 17, which is indicated at 20, and by simply turning said tool, forcing the sides of the flask sections apart against the inherent resiliency of said side walls to permit separation between the mold and the inner surface of the flask so that the said mold may be easily removed from the flask sections.

I claim:

1. A molding flask of the character described including a unitary section having a surrounding wall with a single slit therein to permit opening of said section, and a cover having a perpendicular projection covering said slit and engaging the said section at opposite sides of the slit to retain the section in closed position.

2. A flask of the character described comprising a unitary section having side walls, a rear wall, a slit in said rear wall permitting separation thereof for opening the side walls to permit removal of a mold from said section, a cover for said section, and means extending from said cover over the slit and backing said wall to prevent yielding thereby under pressure within said flask.

3. A dental flask of the character described comprising a unitary section opened at the top and bottom and having a surrounding wall, a slit in said wall permitting separation thereof to release a mold from within said section, a cover, cooperating means on said section and cover for retaining them in relative position, and projections on said cover engaging portions of said wall at opposite sides of the slit and extending over said slit and a portion of said wall to prevent opening of the slit and separation of the wall when pressure is applied within said flask.

THOMAS F. FAGAN.

REFERENCES CITED

The following references are of record in the file of this patent:

UNITED STATES PATENTS

| Number | Name | Date |
|---|---|---|
| 258,858 | Locke | May 30, 1882 |
| 1,680,364 | Clarke et al. | Aug. 14, 1928 |
| 1,962,410 | Rodin | June 12, 1934 |
| 2,059,928 | Berk | Nov. 3, 1936 |
| 2,328,285 | MacDougall | Aug. 31, 1943 |
| 2,359,152 | Pryor et al. | Sept. 26, 1944 |